(12) United States Patent
Rutkowski et al.

(10) Patent No.: US 8,042,664 B2
(45) Date of Patent: Oct. 25, 2011

(54) ELECTRICAL CABLE RETRACTOR ASSEMBLY FOR A MOVABLE WINDOW

(75) Inventors: David J. Rutkowski, Grosse Ile, MI (US); Gary Lee Firman, II, White Lake, MI (US); John Repp, Grosse Ile, MI (US); Brian Rutkowski, Ypsilanti, MI (US)

(73) Assignee: Casco Products Corporation, Bridgeport, CT (US)

( * ) Notice: Subject to any disclaimer, the term of this patent is extended or adjusted under 35 U.S.C. 154(b) by 63 days.

(21) Appl. No.: 12/643,551

(22) Filed: Dec. 21, 2009

(65) Prior Publication Data

US 2011/0147153 A1 Jun. 23, 2011

(51) Int. Cl.
*B65H 75/44* (2006.01)

(52) U.S. Cl. ............. 191/12.2 R; 191/12 R; 191/12.2 A

(58) Field of Classification Search ................ 191/12 R, 191/12.2 R, 12.2 A, 12.4; 49/227, 349
See application file for complete search history.

(56) References Cited

U.S. PATENT DOCUMENTS

| | | | | |
|---|---|---|---|---|
| 2,585,070 A | * | 2/1952 | Allard | 200/61.15 |
| 2,979,576 A | | 4/1961 | Huber | |
| 3,773,978 A | * | 11/1973 | Le Roy | 370/378 |
| 3,773,987 A | * | 11/1973 | Davis et al. | 191/12.4 |
| 4,499,341 A | * | 2/1985 | Boyd | 191/12.4 |
| 4,904,205 A | * | 2/1990 | Rice | 439/504 |
| 4,970,911 A | * | 11/1990 | Ujihara et al. | 74/501.5 R |
| 4,984,389 A | * | 1/1991 | Benoit et al. | 49/502 |
| 5,129,828 A | * | 7/1992 | Bass | 439/35 |
| 5,466,911 A | * | 11/1995 | Spagnoli et al. | 219/203 |
| 5,537,781 A | * | 7/1996 | Bisnack et al. | 49/351 |
| 5,724,769 A | * | 3/1998 | Cripe et al. | 49/360 |
| 5,822,922 A | * | 10/1998 | Grumm et al. | 49/360 |
| 6,112,462 A | * | 9/2000 | Kolar | 49/121 |
| 6,119,401 A | * | 9/2000 | Lin et al. | 49/361 |
| 6,125,585 A | * | 10/2000 | Koneval et al. | 49/349 |

(Continued)

OTHER PUBLICATIONS

"Add-Sliding Rear Window/Glass ????", F150 online Forum.

*Primary Examiner* — Joe Morano, IV
*Assistant Examiner* — Jason C Smith
(74) *Attorney, Agent, or Firm* — Ostrolenk Faber LLP

(57) ABSTRACT

A cable retractor for paying out and retracting an electrical cable providing electrical power to an electrical load on a movable window element comprising a first assembly having a rotatable cable spool for receiving the electrical cable for winding on the cable spool, the first assembly including a first housing having an opening therein for paying out a first end of the electrical cable wound on the spool and at least one electrical terminal for connecting a second end of the electrical cable on the spool to one of an electrical power source or the electrical load; a second assembly having at least one electrical connection connected to the first end of the electrical cable and further being connected to the other one of the electrical load or the electrical power source; thereby to provide power to the electrical load from the electrical cable; one of the first and second assemblies being mounted for movement with the movable window element and the other of the first and second assemblies being fixed; and a guide channel disposed between the first and second assemblies for guiding the electrical cable as the electrical cable is retracted into the first housing on the cable spool as the movable window element moves such that the first and second assemblies move relatively toward each other; whereby the electrical load is provided with electrical power from the electrical power source at all positions of the movable window element.

15 Claims, 13 Drawing Sheets

U.S. PATENT DOCUMENTS

| | | | |
|---|---|---|---|
| 6,276,502 B1* | 8/2001 | Leyba et al. | 191/12.2 R |
| 6,324,788 B1* | 12/2001 | Koneval et al. | 49/121 |
| 6,328,243 B1* | 12/2001 | Yamamoto | 242/378.1 |
| 6,481,772 B1 | 11/2002 | Tenn | |
| 7,871,272 B2* | 1/2011 | Firman et al. | 439/34 |
| 7,900,863 B1* | 3/2011 | Cheng | 242/378.1 |
| 2004/0065017 A1* | 4/2004 | Priest et al. | 49/352 |
| 2006/0011597 A1* | 1/2006 | Dyrdek | 219/203 |
| 2007/0209283 A1* | 9/2007 | Ostrowski et al. | 49/360 |
| 2008/0127563 A1* | 6/2008 | Tooker | 49/349 |
| 2010/0240229 A1* | 9/2010 | Firman et al. | 439/34 |
| 2010/0293857 A1* | 11/2010 | Staser et al. | 49/349 |

* cited by examiner

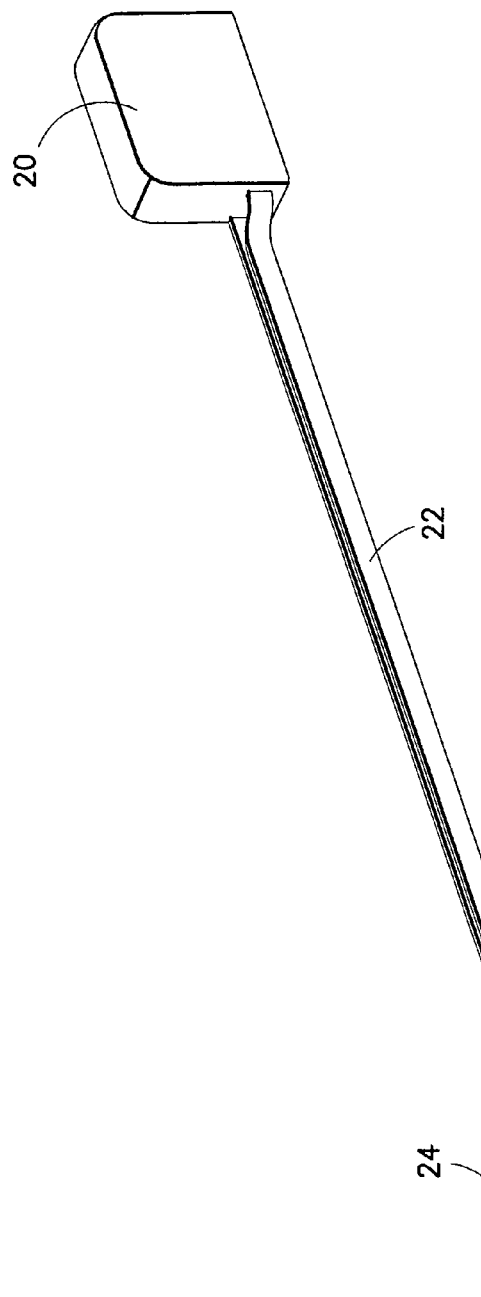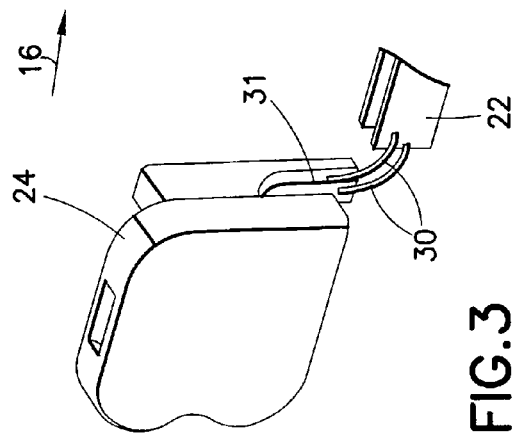

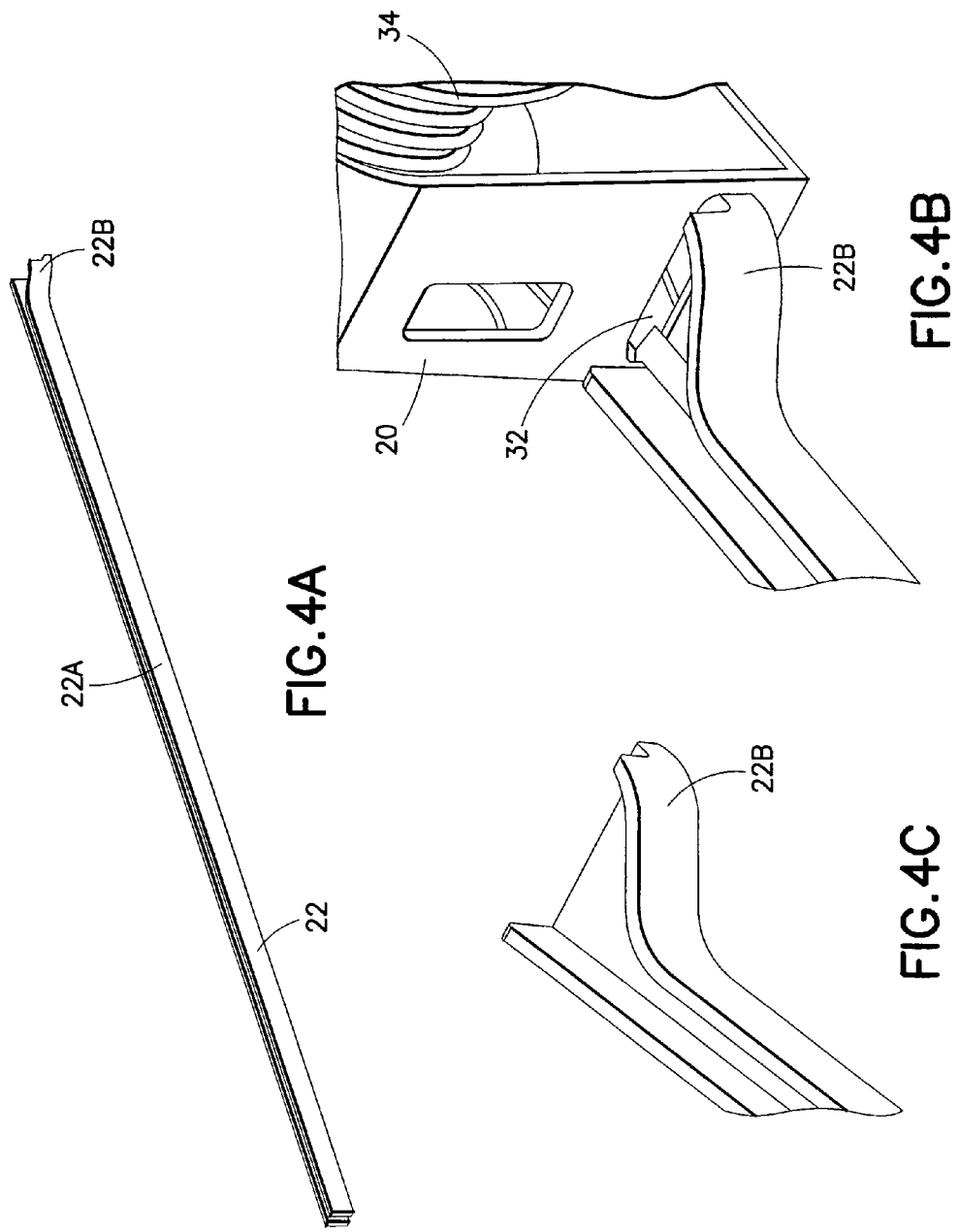

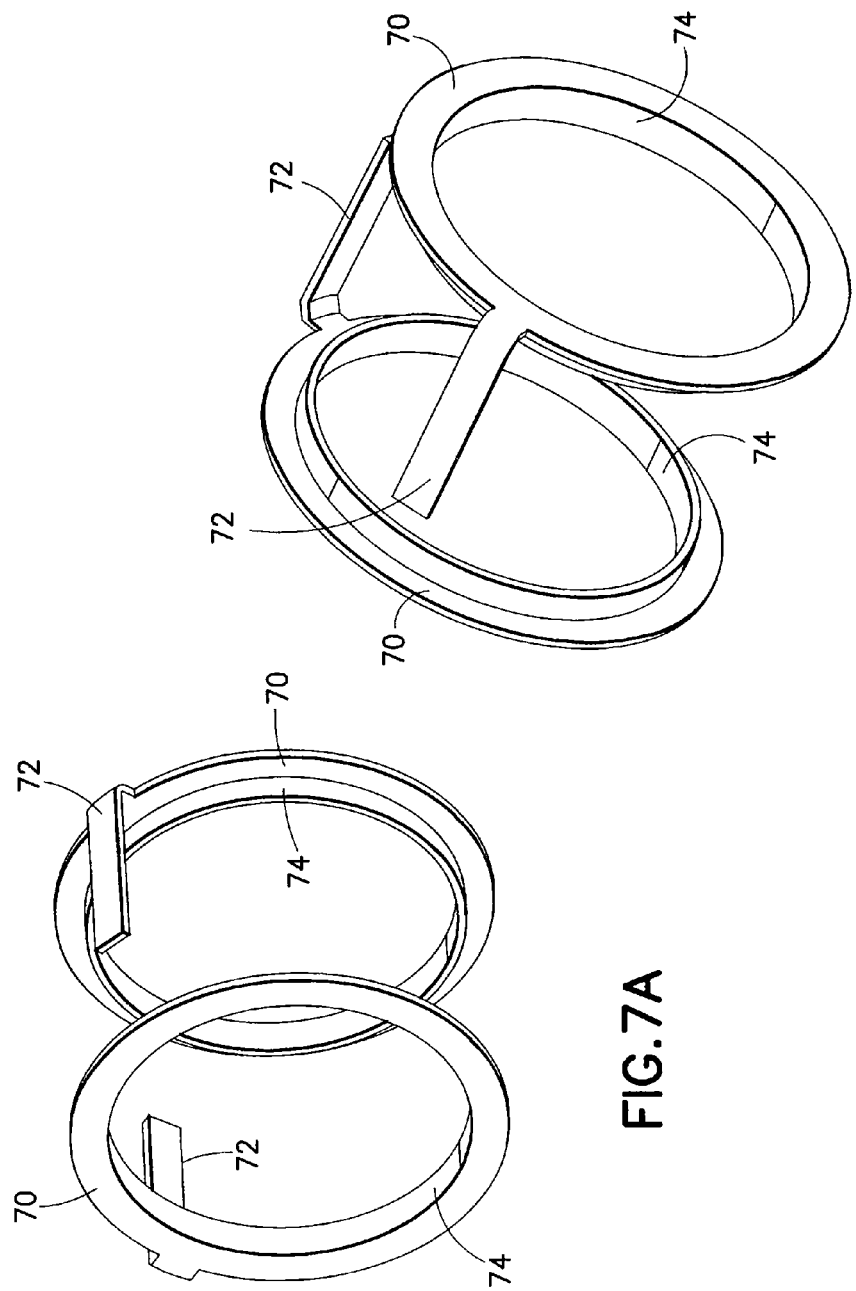

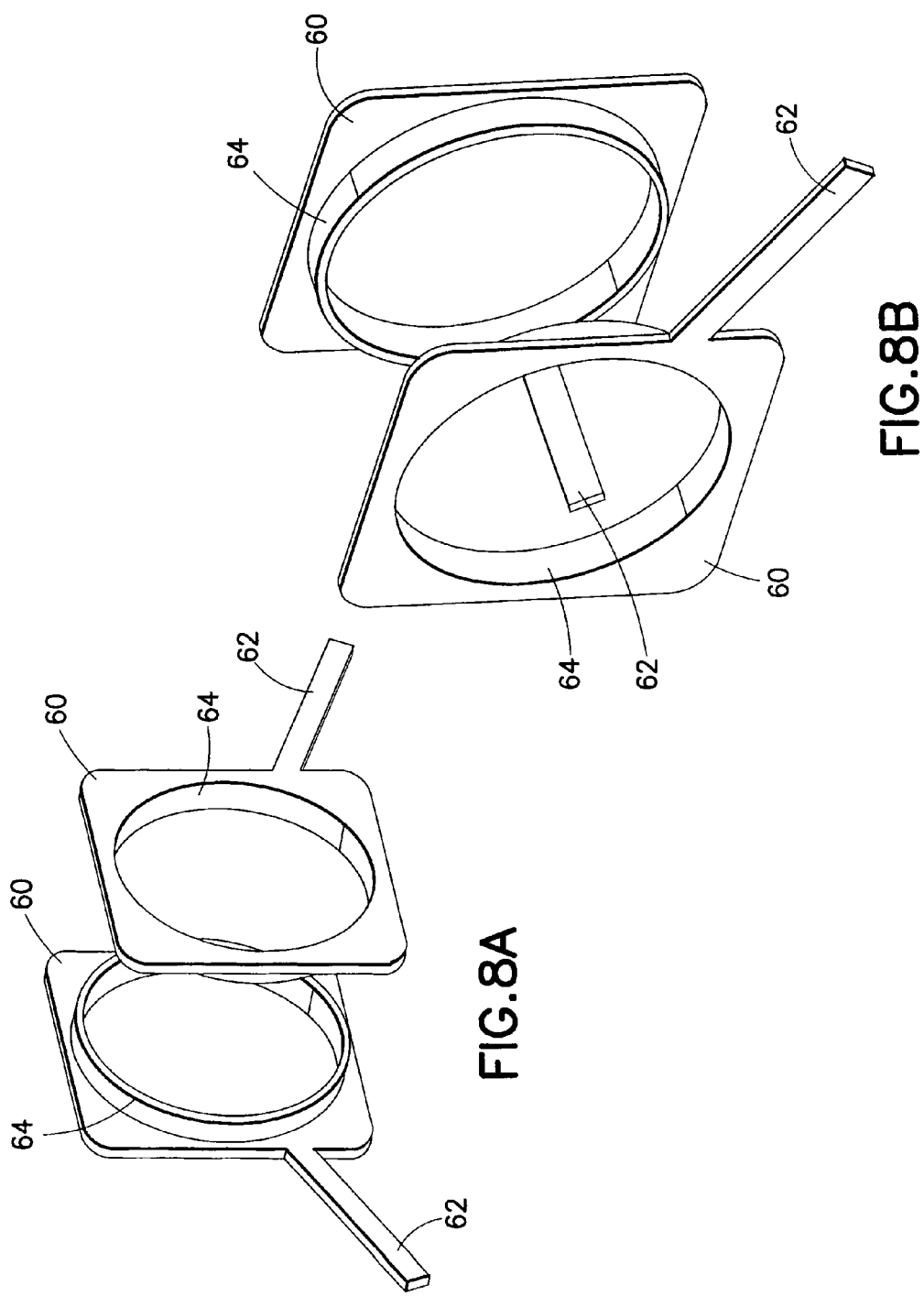

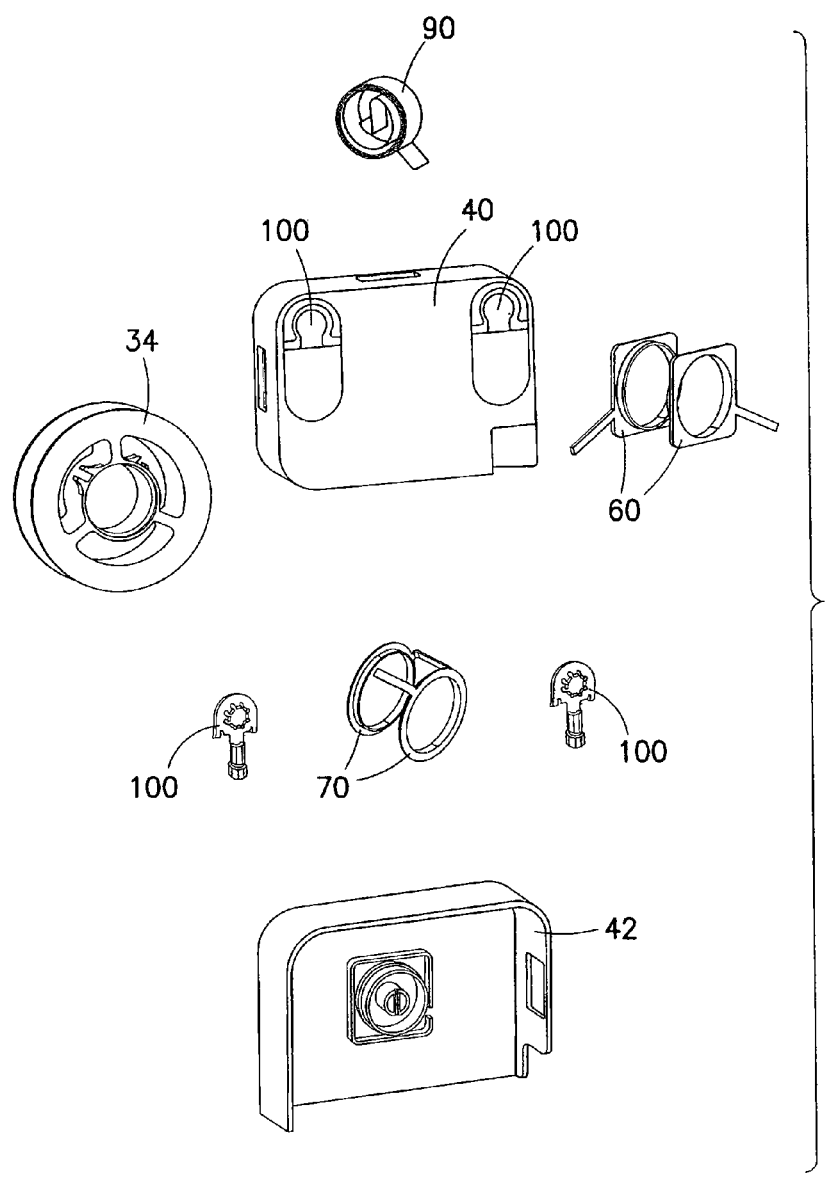

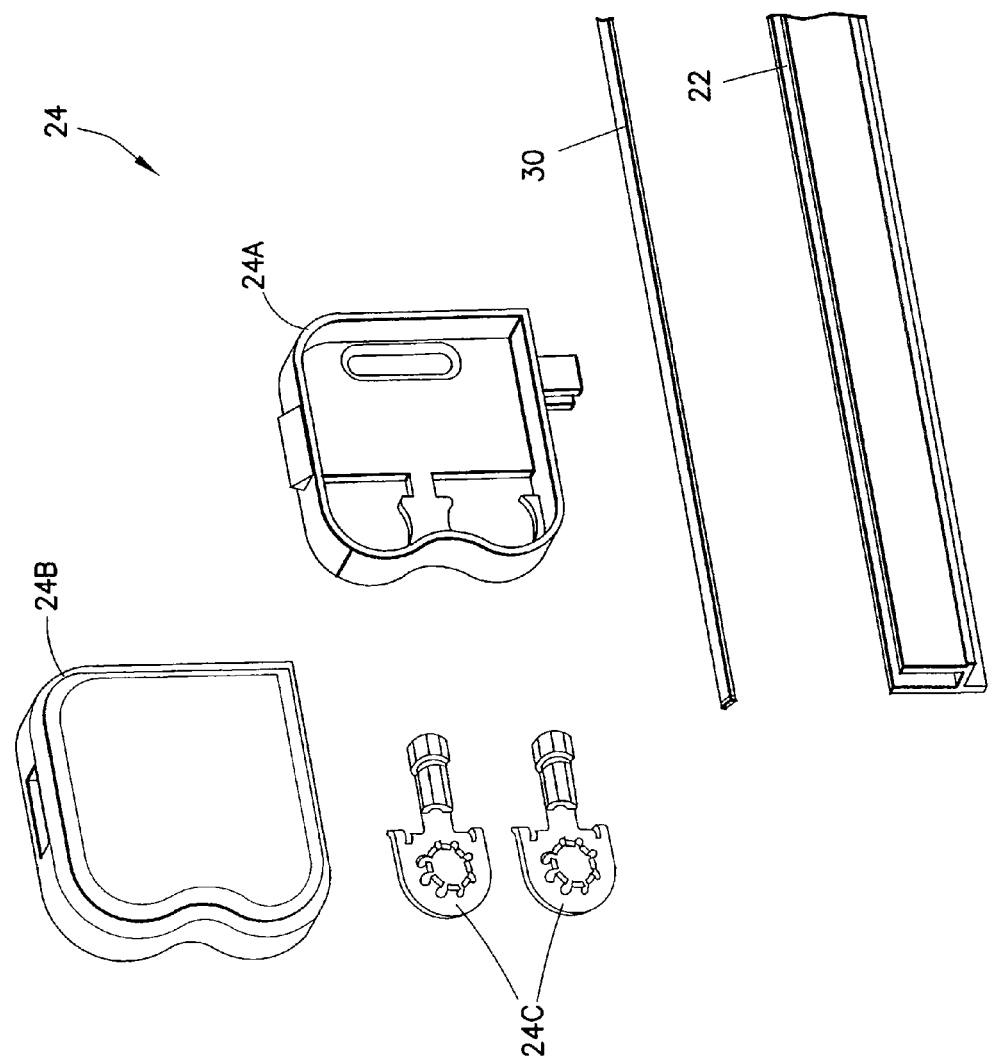

ELECTRICAL CABLE RETRACTOR ASSEMBLY FOR A MOVABLE WINDOW

BACKGROUND OF THE INVENTION

The present invention relates to retractable electrical cable assemblies, and in particular, to a retractable electrical cable assembly that retracts an electrical cable that provides electrical power to a defroster element of a movable sliding window of a vehicle.

Defroster elements are commonly applied to or contained within or on the window glass elements of vehicles to provide a heating function to defrost the windowpane. Some vehicles, for example, pick-up trucks, have a rear window panel that is slidable horizontally to open it. It is desirable to provide a defroster element on such slidable window panels. In U.S. patent application Ser. No. 12/408,192, filed Mar. 20, 2009, entitled Sliding Window Magnetic Electrical Connector, an apparatus for providing electrical power to the defroster element of such a slidable window panel is disclosed. However, in that apparatus, the window panel must be in the closed position to receive electrical power.

It is desirable to be able to provide electrical power to the defroster element of a slidable window panel so that the defroster element is electrically powered in any position of the window panel, i.e., whether the panel is closed, open or in a partially open state.

SUMMARY OF THE INVENTION

The present invention provides a solution to the problem discussed above. According to the invention, a cable retractor for paying out and retracting an electrical cable providing electrical power to an electrical load on a movable window element comprises a first assembly having a rotatable cable spool for receiving the electrical cable for winding on the cable spool, the first assembly including a first housing having an opening therein for paying out a first end of the electrical cable wound on the spool, and at least one electrical terminal for connecting a second end of the electrical cable on the spool to one of an electrical power source or the electrical load; a second assembly having at least one electrical connection connected to the first end of the electrical cable and further being connected to the other one of the electrical load or the electrical power source, one of the first and second assemblies being mounted for movement with the movable window element and the other of the first and second assemblies being fixed; thereby to provide power to the electrical load from said electrical cable; and a guide channel disposed between the first and second assemblies for guiding said electrical cable as the electrical cable is retracted into said first housing on said cable spool as said movable window element moves such that the first and second assemblies more relatively toward each other; whereby the electrical load is provided with electrical power from the electrical power source at all positions of the movable window element.

BRIEF DESCRIPTION OF THE DRAWING(S)

The invention will be described in greater detail in the following detailed description with references to the drawings in which:

FIG. 2 shows the retractable cable assembly of FIG. 1;

FIG. 3 shows the portion of the retractable cable assembly that is mounted on the slidable window panel;

FIGS. 4A, 4B and 4C show views of the cable channel;

FIGS. 7A and 7B show perspective views of the rotatable electrical spool bushings that are mounted on the spool of FIGS. 6A and 6B;

FIGS. 8A and 8B show perspective views of the stationary electrical bushings that are mounted in the housing to supply electrical power to the rotatable bushings mounted on the spool;

FIGS. 10A and 10B show front and rear views of the housing for the cable and spool with the components shown in an exploded view;

FIG. 13 shows a disassembled view of the cable connector that is mounted to the slidable window panel.

DETAILED DESCRIPTION OF PREFERRED EMBODIMENTS OF THE INVENTION

Figure 1:
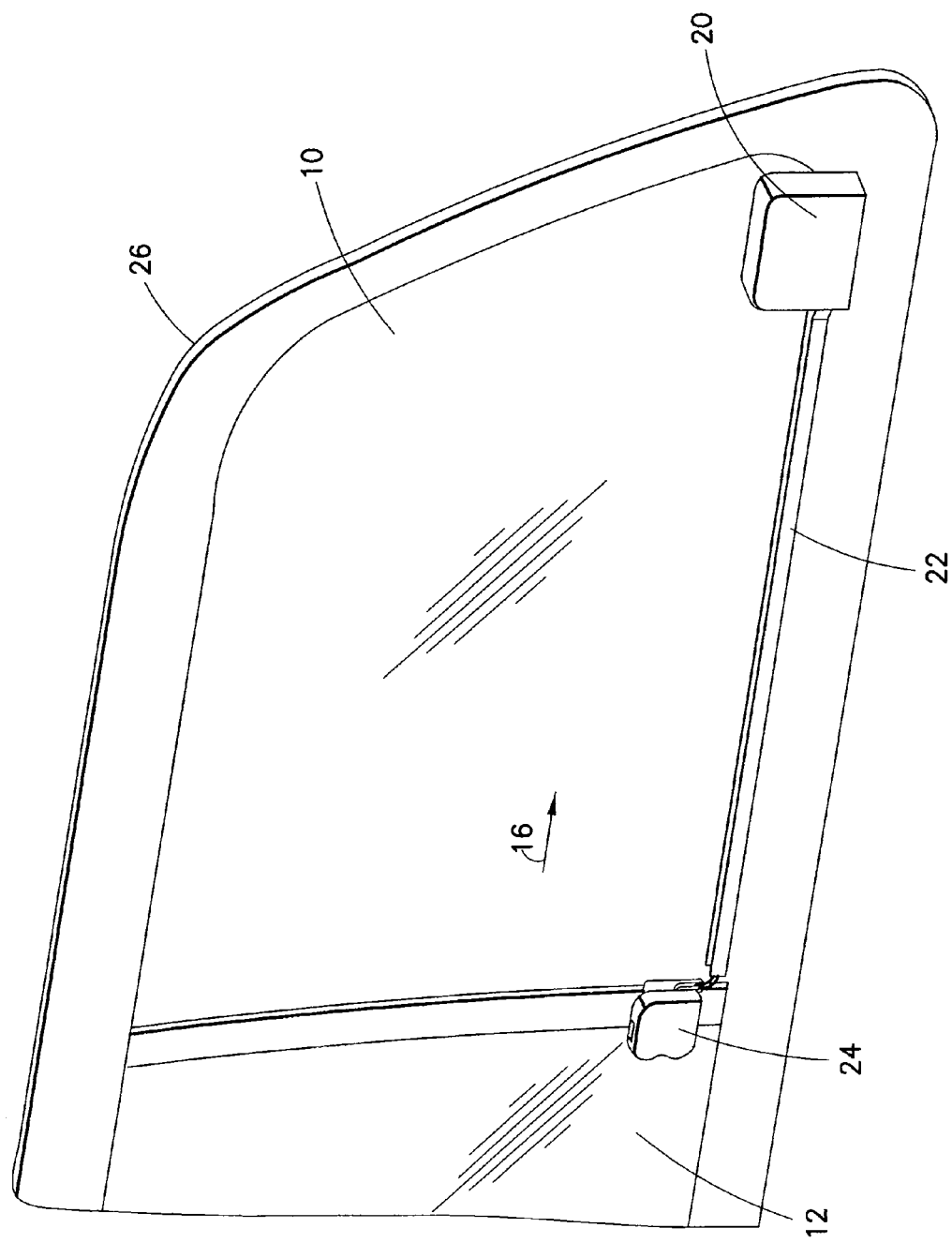
FIG. 1 shows a portion of a window, for example the rear window or back-light of a pick-up truck, showing the non-slidable window panel and a portion of the slidable window panel together with the retractable electrical cable assembly according to the present invention installed on the window.

With reference now to the drawings, FIG. 1 shows a portion of a vehicle window, in particular the rear window of a motor vehicle such as a pick-up truck.

As well known, the window includes a fixed window glazing element 10 and a slidable glazing element 12. Typically, there is also another fixed glazing element on the other side (not shown) of the movable element 12. In the embodiment shown, the movable window glazing element 12 is adapted to slide in tracks (not shown) in the direction of the arrow 16 to open the window. The invention comprises a retractable cable assembly comprising, in the embodiment shown, a fixed retractor assembly 20, a channel 22 and an electrical cable connector 24.

The retractor assembly 20 includes a connection to a source of power, i.e., the vehicle electrical system, typically 12 volts. The assembly 20 includes a rotatable spool disposed inside the assembly, to be described later which is biased, preferably by a spring, to wind up the spool. The spool has an electrical cable wound thereon that is retracted into the spool when the movable window element 12 is moved in the direction of the arrow 16. An electrical cable extends out from the retractor assembly 20 and rides in the channel 22 and terminates at the connector assembly 24. In particular, preferably two conductors of the cable inside the channel 22 are connected to connections that are contained inside the connector assembly 24 which connect the conductors to the electrical defroster element that is mounted to, in or on the movable window glazing 12. The entire window assembly is mounted to the vehicle via a frame assembly 26, in known fashion.

FIG. 2 shows further details of the retractable cable assembly including the fixed retractor assembly 20, the cable channel 22 and the connector 24 that is mounted on the movable glazing element.

FIG. 3 shows details of the channel 22 and the movable connector 24. The electrical cable, comprising two conductors 30, is disposed in the channel. A guide element 31 holds the cable 30 so that it is directed downwardly into the channel 22. When the movable window glazing 12 is moved in the direction of the arrow 16, the retractor assembly 20 exerts a biasing force by virtue of a spring, to be described later, mounted in the retractor assembly 20 that causes the cable 30 to be taken up on the spool in the retractor assembly 20 as the glazing element is moved in the direction of the arrow 16. Thus, at any position of the glazing element 12, electrical power is provided to the connector assembly 24 and therefore to the defroster element mounted on the glazing element 12.

FIGS. 4A, B and C show details of the channel. The channel includes a main channel element 22A which is disposed along the bottom of the fixed glazing element 10. At the retractor assembly 20 end, the cable guide is provided with an expanded opening 22B. The expanded opening 22B attaches to the housing of the retractor assembly 20. The retractor assembly 20 includes an opening 32 through which the cable is paid out of the housing 20 by the spool 34 which is shown only partially in FIG. 4B.

Figure 5A:
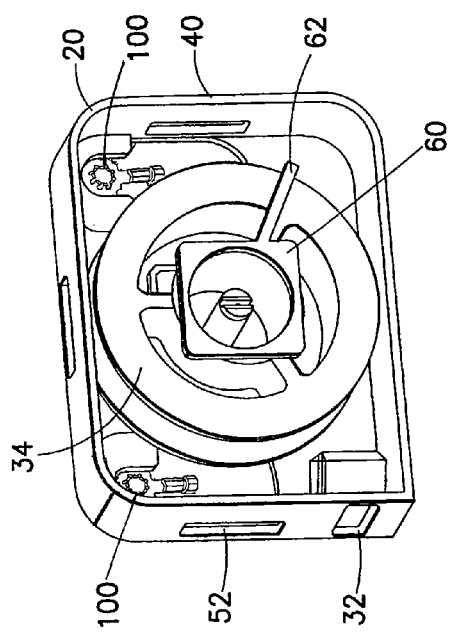
FIGS. 5A, 5B and 5C show interior views of the cable retractor assembly.
Figure 5C:
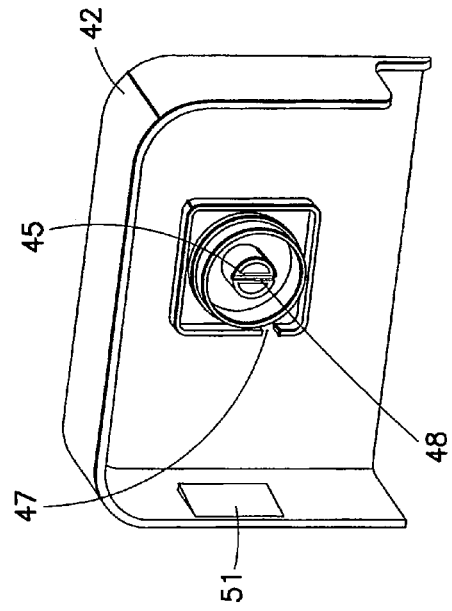
Figure 5B:
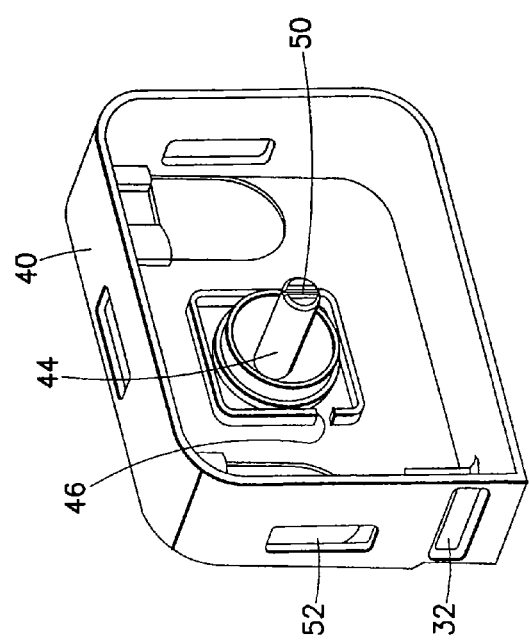

FIG. 5A shows an interior view of the retractor assembly 20. The retractor assembly 20 includes a base 40 that is mounted adjacent to the fixed glazing element 10 or on the vehicle body of the window frame. There is also provided an outside cover 42 shown in FIG. 5C. The base 40 includes a post 44 about which the spool 34 is centered for rotation. The post 44 includes a notch 50 for the receipt of one end of a concentrically arranged spring not shown in FIG. 5 which will be described later. The spring is a spiral spring, one end of which is received in the notch 50 in post 44 and the other end of which is attached to the cable spool. In this way, when the spring is most unwound, the electrical cable will be fully wound on the spool 34. The spring provides a constant force to the cable. When the cable is unwound from the spool 34 when the window element 12 is closed, the spring will be wound to its maximum extent. When the window is open, the biasing force of the wound spring will cause the spool to rotate to retract the cable into the housing 20 around the spool.

The outside cover 42 includes a ring 45 that slides on and is centered on the post 44 and has a plate 48 that is received in the notch 50 on the post 44 for alignment. The base 40 includes an opening 32 for the pay out of the electrical cable. Preferably, the outside cover 42 snaps on to the base 40 using detent projections 51 that are received in openings 52 in the inside base 40. Preferably base 40 and cover 42 are made of a molded, electrically insulating plastic.

Also partly shown in FIG. 5A is one of the fixed electrical bushings 60 that receive electrical power from the vehicle's electrical power source. There is a corresponding bushing 60 not shown on the other side of the spool 34 for connection to the other side of the vehicle electrical power source. Additionally, not visible in FIG. 5A are rotatable electrical bushings that are in contact with respective ones of the stationary bushings 60. These rotatable bushings are concentrically mounted in electrical sliding contact with the fixed bushings 60 to transfer electrical current to the cable wound on the spool 34. The fixed bushings have electrical connectors 62 that are received in respective slots 46 and 47 molded into the back 40 and cover 42. The bushings 60 are made of a suitable electrically conductive material, e.g., copper, brass or bronze.

Figure 6B:
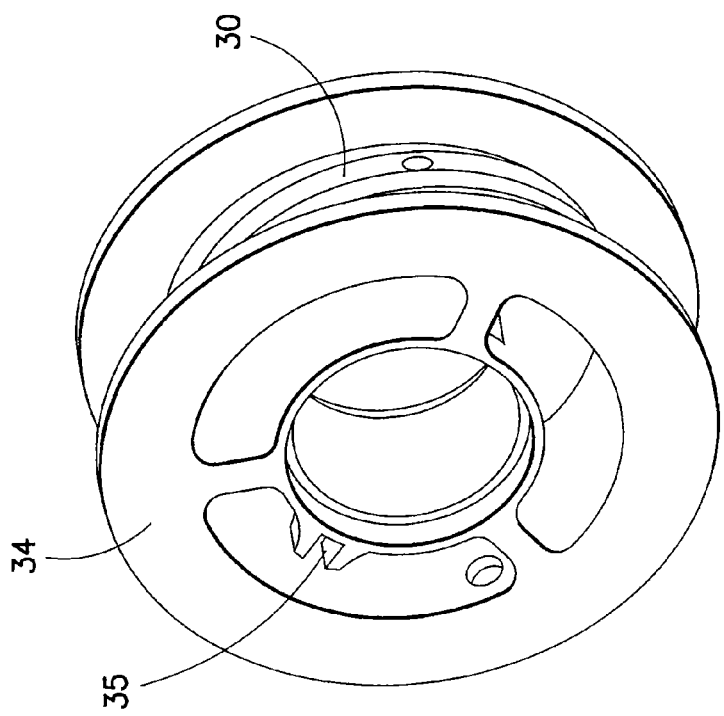
FIGS. 6A and 6B show perspective views of the cable spool.
Figure 6A:
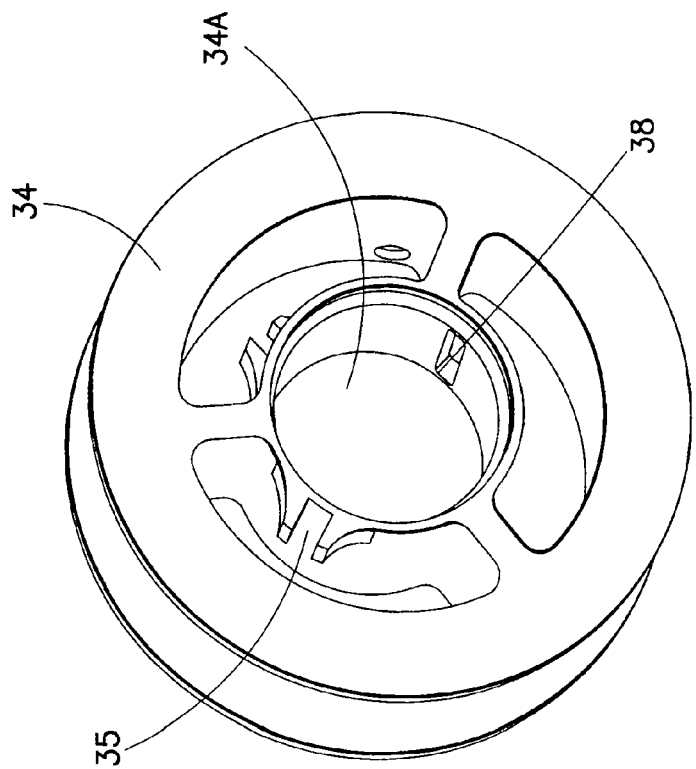

FIGS. 6A and 6B show details of the cable spool 34. The spool 34 shown in FIG. 6B has the electrical cable 30 wound thereon. The spool 34 includes notches 35 which are used to fix the rotatable bushings thereto. The spool 34 has a notch 38 for receiving the movable end of the spiral spring concentrically wound in the central opening 34A of the spool.

The rotatable bushings are shown in FIGS. 7A and 7B. Each rotatable bushing is made by made of a suitable electrically conductive material, for example, copper, brass or bronze and comprises an annular element 70 having locating connecting arms 72 disposed thereon which are received in respective notches 35 of the spool and electrically connected, as by crimping, welding, soldering or some other suitable electrically conducting means, to the cable 30 conductors. The two notches 35 are disposed at different angular positions on the spool 34 so that the bushings 70 do not come into electrical contact with each other. Because they are fixed to the spool by the arms 72, they rotate with the spool 34. Each bushing preferably includes a shoulder portion 74.

FIGS. 8A and 8B show the fixed bushings 60 that are in electrical contact with the respective ones of the rotatable bushings 70. Each bushing 60 includes a connector arm 62 in the same plane as the bushing which is provided so as to connect to the vehicle electrical system to thereby allow current to flow to the rotatable bushings and via the electrical cable 30 to the movable connector assembly 24 mounted on the movable glazing element. As shown, each stationary bushing preferably includes a shoulder portion 64 for slidably electrically contacting with respective shoulder portions 74 on the rotatable bushings 70.

Figure 9B:
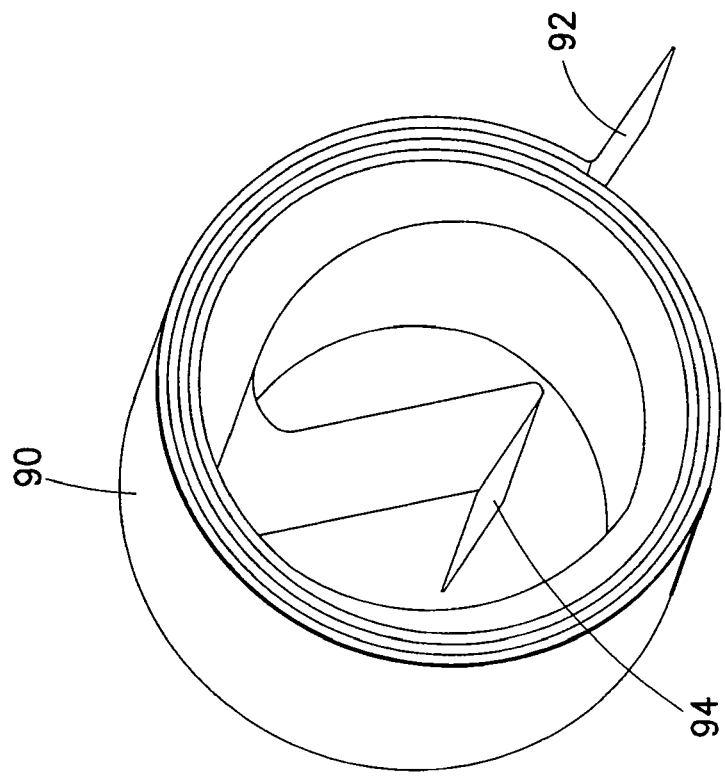
FIGS. 9A and 9B show perspective views of the spiral spring that is mounted to the spool between the spool and the housing to enable the spool to retract the electrical cable.
Figure 9A:
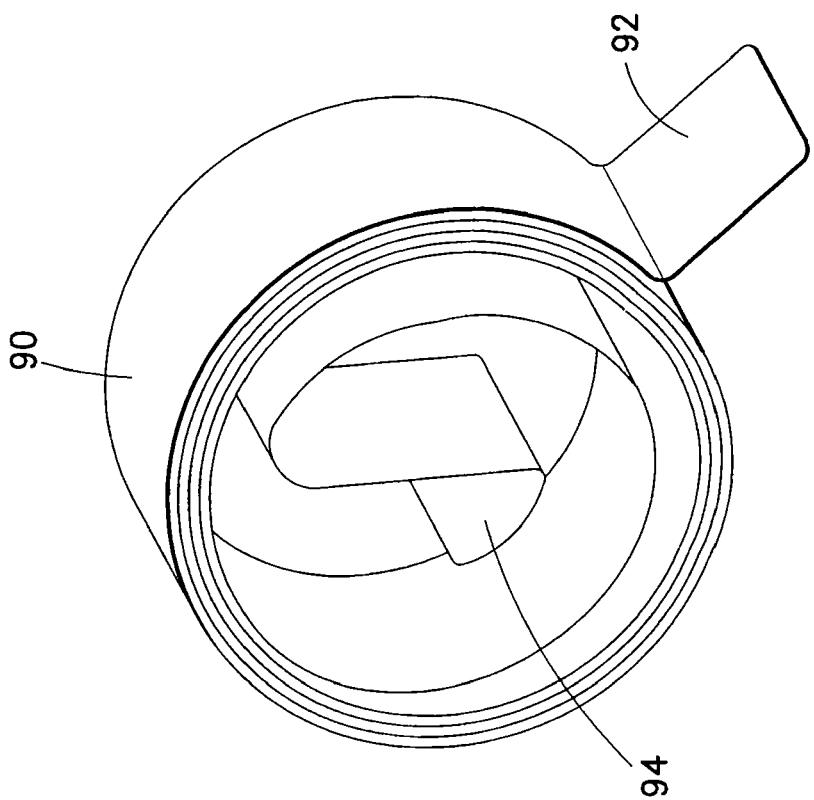

FIGS. 9A and 9B show perspective views of the spiral spring 90, which preferably is made of a stainless steel material to prevent corrosion. The spring includes a movable end 92 that is received in the notch 38 in the spool 34. See FIG. 6A. The spiral spring also includes a fixed second end 94 that is adapted to be received in a notch 50 in post 44 of base 40. The spring 90 is most unwound when the cable 30 is fully wound on the spool 34.

Figure 10A:
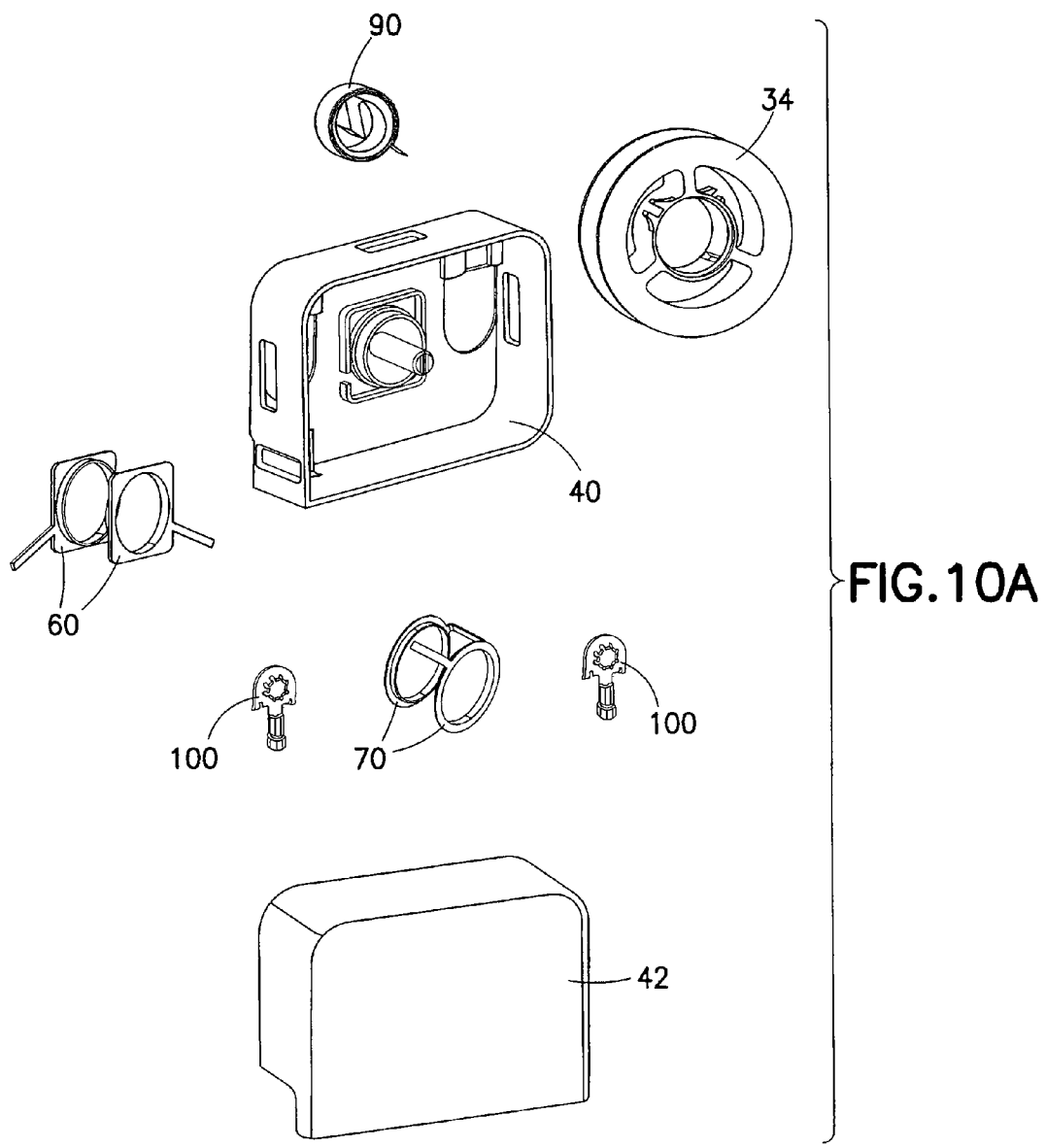

FIGS. 10A and 10B show the front and rear views of the retractor assembly 20 showing the various parts.

The views of FIG. 10 show the electrical terminals 100 that are connected to the vehicle electrical system and in turn connected to the arms 62 of the two stationary electrical bushings 60 to transfer power to the rotating bushings 70 and to the two conductors of the electrical cable 30 and to the movable connector 24 for providing power to the defroster element on the movable window.

Figure 11:
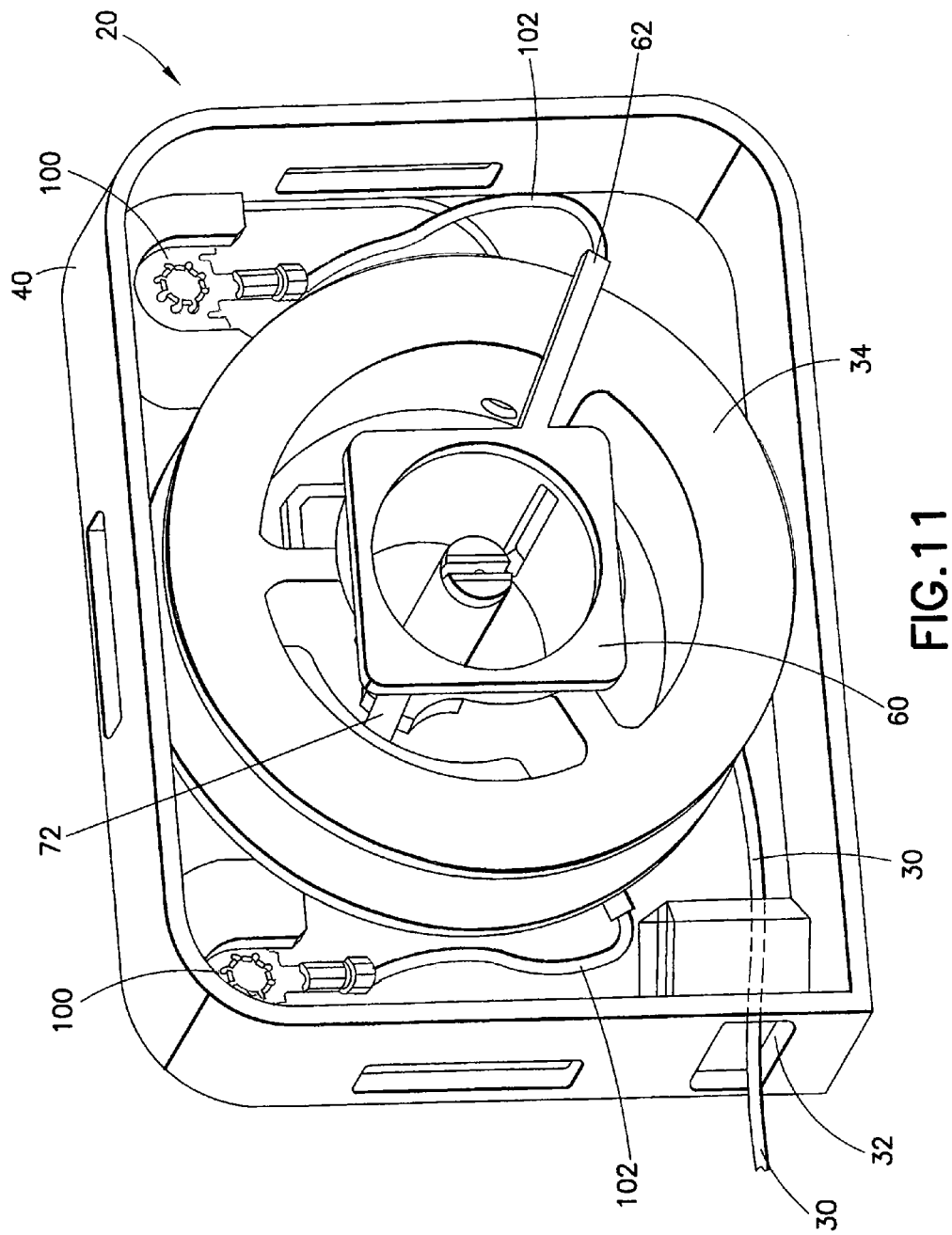
FIG. 11 shows an interior view of the assembled cable retractor assembly.

FIG. 11 shows the retractor assembly 20 in the assembled condition with the cover 42 removed. Wires 102 or other suitable electrical connectors are provided between the arms 62 of the stationary bushings 60 and the terminals 100 for providing electrical power to the stationary bushing 60. Wires 102 are connected to arms 62 by soldering, welding, or crimping or by any suitably electrically conductive means. The electrical cable 30 is shown as it extends from the cable spool 34 through the opening 32 in the housing 40.

Figure 12:
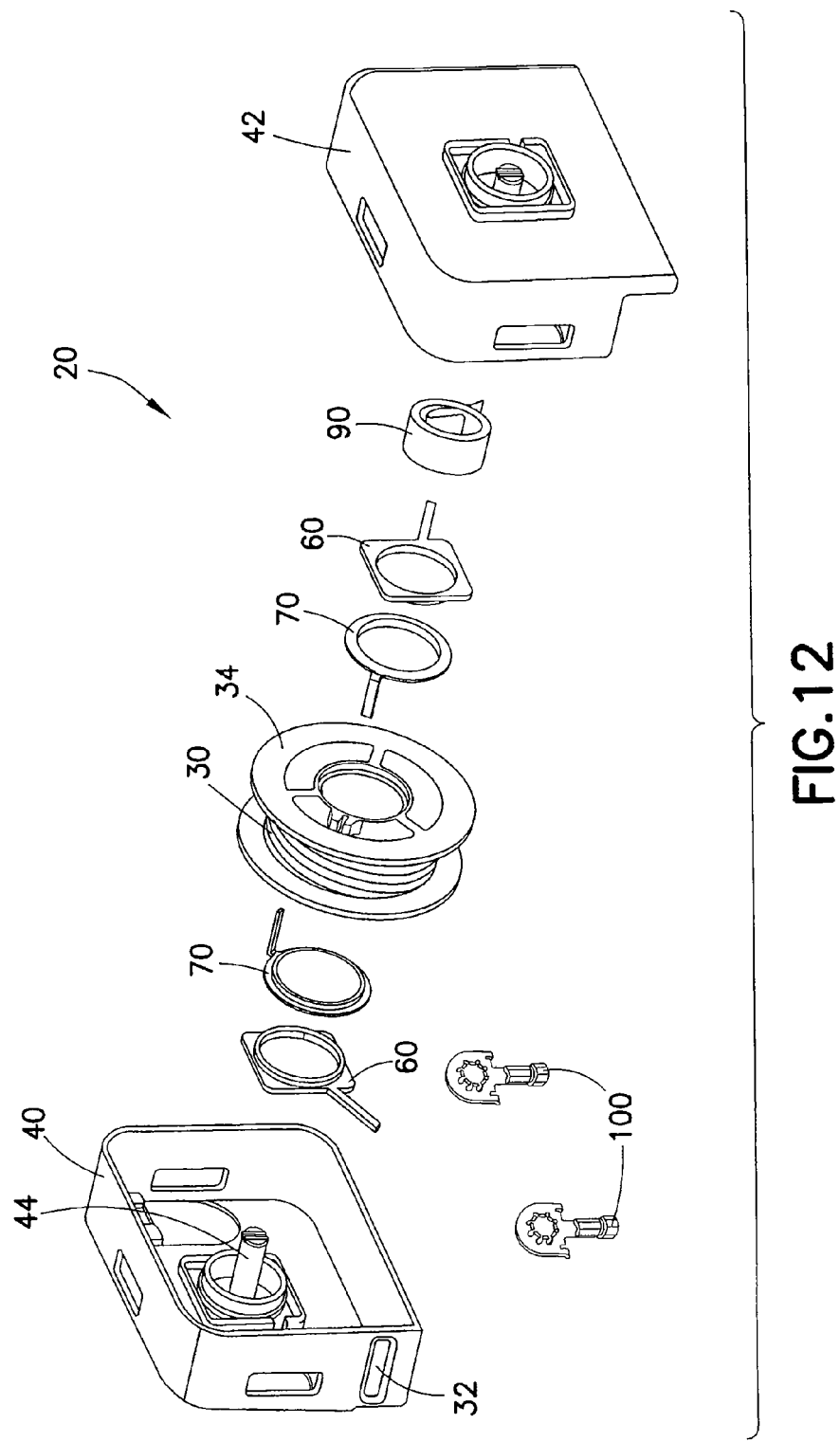
FIG. 12 shows an exploded view of the cable retractor assembly.

FIG. 12 shows an exploded view of the retractor assembly 20.

FIG. 13 shows a disassembled view of the connector 24 including the base 24A, cover 24B and two terminals 24C which are connected to the two wire cable 30 that rides in the cable guide 22. The two electrical terminals 24C are connected to the defroster element that is disposed on or in the movable glazing element 12. The base 24A and cover 24B are preferably made of a suitable insulating molded plastic.

Accordingly, in use, electrical power is always provided to the defroster element when the defroster element is turned on by the user. If the user decides to open the window, the defroster element remains powered. The spring wound spool 34 in the retractor assembly 20 provides a constant force to the electrical cable 30 which is retracted back on to the spool 34 along the cable guide 22. The cable guide 22 ensures that the cable 30 maintains a neat disposition as the cable spool 34 retracts the cable. It also protects the cable 30 from damage. As is evident, in any position of the movable window glazing 12, electrical power is provided to the defroster element, even when the glazing element is completely open or in any position between completely open and fully closed.

The present invention operates with both manually operated windows and windows that are operated by an electrical motor.

The present invention can also be applied to other movable window elements other than the rear window of a pick-up truck. For example, the present invention can be applied to provide electrical power to the defroster element of a movable moon roof or sun roof of a vehicle.

Although the electrical conductors 30 are preferably provided as a two conductor cable, the electrical conductors can be individual electrical wires.

Although a two conductor cable 30 or two wires are shown in the embodiment, it is possible to implement the invention using only a single conductor. The return conductor can be made to the vehicle electrical system ground via a frame for the movable glazing element 12 and the channel in which the movable glazing element 12 slides. However, it is preferable to provide two conductor cables to provide the most reliable electrical connection.

The electrical bushings 60 and 70 are constructed of an electrically conductive material, such as copper, brass or bronze. The bushings rotate one within the other and allow electrical current to flow between them and to the movable window conductors. Preferably, the electrical bushings serve as the support for the retractor spool 34 allowing it to rotate freely.

The movable window electrical conductors 30 ride in the track 22 to protect them from direct access and to visually conceal them.

In the embodiment shown, electrical power to the movable window 12 comes from the retractor assembly 20 attached to the stationary glazing 10. Optionally, the assembly 20 could be attached to the vehicle body rather than the window if that were the choice of the vehicle manufacture. The retractor spring 90 in the retractor spool 34 does not conduct current in the embodiment shown. However, the retractor spring itself could be used as one of the conductors, replacing one set of electrical bushings. The defroster circuit of the vehicle electrical system can be connected directly to the spring housing. In this embodiment, the retractor housing 20 could provide defrost electrical power to both the movable window and the fixed glazing to which it is attached.

Other modifications are possible. For example, a spiral spring is shown to provide the retracting force. Alternatively, the retracting force could be provided by an electric motor wired to the vehicle electrical source.

Furthermore, the retractor assembly is shown as the fixed assembly in the embodiment shown. Alternatively, the retractor assembly could be mounted on the movable window element and be connected to the defroster element. The fixed assembly would then be mounted at the other end of the cable guide 22 and be electrically connected to the vehicle electrical power source.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A cable retractor for paying out and retracting an electrical cable providing electrical power to an electrical load on a movable window element comprising:
   a first assembly having a rotatable cable spool for receiving the electrical cable for winding on the cable spool, the first assembly including a first housing having an opening therein for paying out a first end of the electrical cable wound on the spool, and at least one electrical terminal for connecting a second end of the electrical cable on the spool to one of an electrical power source or the electrical load;
   a second assembly having at least one electrical connection connected to the first end of the electrical cable and further being connected to the other one of the electrical load or the electrical power source;
   one of the first and second assemblies being mounted for movement with the movable window element and the other of the first and second assemblies being fixed; thereby to provide power to the electrical load from said electrical cable; and
   a guide channel disposed between the first and second assemblies for guiding said electrical cable as the electrical cable is retracted into said first housing on said cable spool as said movable window element moves such that the first and second assemblies move relatively toward each other;
   whereby the electrical load is provided with electrical power from the electrical power source at all positions of the movable window element.

2. The cable retractor of claim 1, wherein the first assembly is fixed and the second assembly is mounted for movement with the movable window element, the first assembly having said electrical terminal connected to the electrical power source, the second assembly mounted for movement with the movable window element being electrically connected to the electrical load.

3. The cable retractor of claim 2, wherein the first assembly comprises said cable spool mounted rotatably in the first housing and a spring disposed between the spool and the housing providing a bias to rotate said cable spool thereby to retract the electrical cable into the housing.

4. The cable retractor of claim 3, wherein the spring comprises a spiral spring providing a substantially constant force to said cable spool and said cable.

5. The cable retractor of claim 4, wherein the spring is stainless steel.

6. The cable retractor of claim 1, wherein the electrical load comprises a defroster heating element on the movable window element.

7. The cable retractor of claim 1, wherein the movable window element is a window panel of an automotive vehicle.

8. A cable retractor for paying out and retracting an electrical cable providing electrical power to an electrical load on a movable window element comprising:
   a first assembly having a rotatable cable spool for receiving the electrical cable for winding on the cable spool, the first assembly including a first housing having an opening therein for paying out a first end of the electrical cable wound on the spool, and at least one electrical terminal for connecting a second end of the electrical cable on the spool to one of an electrical power source or the electrical load;
   a second assembly having at least one electrical connection connected to the first end of the electrical cable and further being connected to the other one of the electrical load or the electrical power source;

one of the first and second assemblies being mounted for movement with the movable window element and the other of the first and second assemblies being fixed;

thereby to provide electrical power to the electrical load from said electrical cable; and a guide channel disposed between the first and second assemblies for guiding said electrical cable as the electrical cable is retracted into said first housing on said cable spool as said movable window element moves such that the first and second assemblies move relatively toward each other;

whereby the electrical load is provided with electrical power from the electrical power source at all positions of the movable window element;

wherein the first assembly is fixed and the second assembly is mounted for movement with the movable window element, the first assembly having said electrical terminal connected to the electrical power source, the second assembly mounted for movement with the movable window element being electrically connected to the electrical load;

wherein the first assembly comprises said cable spool mounted rotatably in the first housing and a spring disposed between the spool and the housing providing a bias to rotate said cable spool thereby to retract the electrical cable into the housing; and further comprising a stationary electrical bushing mounted in said housing and a rotatable electrical bushing mounted for rotating movement on said cable spool and in electrical sliding contact with said fixed electrical bushing, the rotatable bushing connected to the second end of said cable for allowing electrical current to flow between the stationary and rotatable bushings and the electrical cable.

9. The cable retractor of claim 8, wherein the electrical cable comprises two electrical conductors and there are provided two electrical bushing pairs, each pair comprising a stationary bushing and a rotatable bushing and each rotatable bushing being connected to the second ends of respective ones of said two electrical conductors of said electrical cable.

10. The cable retractor of claim 9, wherein the stationary bushings are connected to the electrical power source.

11. The cable retractor of claim 9, wherein the electrical bushings comprise concentric annular shaped elements having shoulders in electrical sliding contact.

12. The cable retractor of claim 11, wherein the rotatable bushings include extending arms for fixing the rotatable bushings to the cable spool and for allowing electrical contact to be made with second ends of the electrical cable.

13. The cable retractor of claim 12, wherein the stationary bushings include extending arms for electrically engaging with conductors coupled to the electrical power source.

14. The cable retractor of claim 9, wherein the first housing comprises a base housing element including a first recess for receiving a first stationary electrical bushing and a cover housing element for closing off the base housing element and enclosing said cable spool and spring and having a second recess for receiving a second stationary electrical bushing.

15. The cable retractor of claim 14, wherein the cable spool includes a plurality of notches for fixing said rotatable electrical bushings for rotatable movement with the cable spool.

* * * * *